R. W. EDWARDS.
Finger-Ring.
No. 211,558. Patented Jan. 21, 1879.
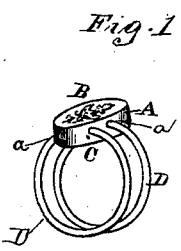
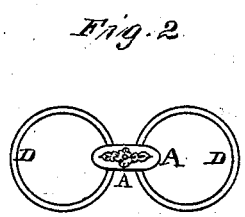
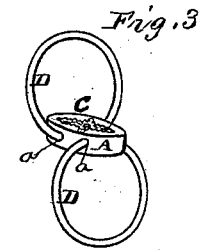
Witnesses
Geo. H. Strong
Frank A. Brooks
Inventor
Robt W. Edwards
By Dewey & Co.
Attys.

UNITED STATES PATENT OFFICE.

ROBERT W. EDWARDS, OF SAN FRANCISCO, CALIFORNIA.

IMPROVEMENT IN FINGER-RINGS.

Specification forming part of Letters Patent No. 211,558, dated January 21, 1879; application filed August 19, 1878.

*To all whom it may concern:*

Be it known that I, ROBERT WILLIAM EDWARDS, of the city and county of San Francisco and State of California, have invented Improvements in Jewelry; and I do hereby declare the following to be a full, clear, and exact description thereof, reference being had to the accompanying drawings.

My invention relates to certain improvements in finger-rings; and it consists in a duplex ring inserted in a double-faced setting, whereby said setting may be reversed to give a different front, at pleasure, with the same ring.

In order to more fully explain my invention, reference is made to the accompanying drawings, in which—

Figures 1, 2, and 3 show my improved invention in finger-rings.

In the said drawings, A is a stone or setting, having on each side different designs B C, as may be desired. Through holes $a$ $a$ in said setting or stone are introduced rings D D, of a size suitable to fit the finger.

When it is desired to expose a new side of the setting the rings D D are passed over its ends, as shown in Figs. 2 and 3.

I am aware that pins have been constructed with a central stone or setting inclosed in a frame, so as to turn upon end pivots and reverse, and I do not therefore claim such a device, broadly; but What I do claim as new, and desire to secure by Letters Patent, is—

As an improved finger-ring, the duplex rings D D, in combination with the perforated reversible setting A, as set forth.

In witness whereof I hereunto set my hand.

ROBERT W. EDWARDS.

Witnesses:
 GEO. W. STRONG,
 FRANK A. BROOKS.